(12) United States Patent
Aharoni et al.

(10) Patent No.: US 11,531,753 B2
(45) Date of Patent: *Dec. 20, 2022

(54) PREVENTING RANSOMWARE FROM ENCRYPTING FILES ON A TARGET MACHINE

(71) Applicant: Palo Alto Networks, Inc., Santa Clara, CA (US)

(72) Inventors: Eldar Aharoni, Holon (IL); Vadim Goldstein, Rishon Lezion (IL); Mashav Sapir, Ness-Ziona (IL); Jenny Kitaichik, Ramat-Gan (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/228,554

(22) Filed: Apr. 12, 2021

(65) Prior Publication Data

US 2021/0256117 A1 Aug. 19, 2021

Related U.S. Application Data

(63) Continuation of application No. 16/130,636, filed on Sep. 13, 2018, now Pat. No. 11,010,469.

(51) Int. Cl.
*G06F 21/00* (2013.01)
*G06F 21/55* (2013.01)
*G06F 21/56* (2013.01)

(52) U.S. Cl.
CPC .......... *G06F 21/554* (2013.01); *G06F 21/566* (2013.01); *G06F 2221/034* (2013.01)

(58) Field of Classification Search
None
See application file for complete search history.

(56) References Cited

U.S. PATENT DOCUMENTS

| 9,104,867 | B1* | 8/2015 | Thioux | H04L 63/1416 |
| 10,148,693 | B2* | 12/2018 | Singh | G06F 21/00 |
| 2012/0255000 | A1* | 10/2012 | Sallam | G06F 21/566 |
| | | | | 726/23 |
| 2012/0255003 | A1* | 10/2012 | Sallam | G06F 21/554 |
| | | | | 726/23 |

(Continued)

OTHER PUBLICATIONS

Koniaris, Ioannis et al. Analysis and visualization of SSH attacks using honeypots. Eurocon 2013. https://ieeexplore.ieee.org/stamp/stamp.jsp?tp=&arnumber=6624967 (Year: 2013).*

(Continued)

*Primary Examiner* — Jeremiah L Avery
(74) *Attorney, Agent, or Firm* — Van Pelt, Yi & James LLP

(57) ABSTRACT

Techniques for preventing ransomware from encrypting files on a target machine are disclosed. In some embodiments, a system/process/computer program product for preventing ransomware from encrypting files on a target machine includes monitoring file system activities on a computing device; detecting an unauthorized activity associated with a honeypot file or honeypot folder; and performing an action based on a policy in response to the unauthorized activity associated with the honeypot file or honeypot folder.

21 Claims, 9 Drawing Sheets

(56) References Cited

U.S. PATENT DOCUMENTS

| | | | | |
|---|---|---|---|---|
| 2013/0312099 A1* | 11/2013 | Edwards | .............. | G06F 21/554 726/24 |
| 2017/0324755 A1* | 11/2017 | Dekel | .................... | G06F 21/60 |
| 2019/0108333 A1* | 4/2019 | Licata | .................... | H04L 63/02 |

OTHER PUBLICATIONS

Sun, Xiaoyan et al. Collecting Internet Malware Based on Client-side Honeypot. 2008 The 9th International Conference for Young Computer Scientists. https://ieeexplore.ieee.org/stamp/stamp.jsp?tp=&arnumber=4709194 (Year: 2008).*

Moore, Chris. Detecting Ransomware with Honeypot Techniques. 2016 Cybersecurity and Cyberforensics Conference (CCC). https://ieeexplore.ieee.org/stamp/stamp.jsp?tp=&arnumber=7600214 (Year: 2016).*

Nicolo' Andronio, Heldroid: Fast and Efficient Liguistic-Based Ransomware Detection, Thesis, submitted in the Graduate College of the University of Illinois at Chicago, 2015.‡

Sgandurra et al., Automated Dynamic Analysis of Ransomware: Benefits, Limitations and Use for Detection, Sep. 10, 2016.‡

Scaife et al., CryptoLock (and Drop it): Stopping Ransomware Attacks on User Data, 2016 IEEE 36th International Conference on Distributed Computing Systems, 2016.‡

Chris Moore, Detecting Ransomware with Honey Pot Techniques, 2016 Cybersecurity and Cyberforensics Conference, IEEE, 2016.‡

Daniel Nieuwenhuizen, A Behavioural-Based Approach to Ransomware Detection, MWR Labs, MWR Labs Whitepaper, retrieved Aug. 29, 2018.‡

Cabaj et al., Software-Defined Networking-based Crypto Ransomware Detection Using HTTP Traffic Characteristics, retrieved Aug. 29, 2018.‡

Park, Jin-hak et al. How to Design Practical Client Honeypots Based on Virtual Environment. 2016 11th Asia Joint Conference on Information Security (AsiaJCIS), https://ieeexplore.ieee.org/stamp/stamp.jsp?tp=&arnumber=7782060 (Year: 2016).‡

Beham, Michael et al. Intrusion detection and honeypots in nested virtualization environments. 2013 43rd Annual IEEE/IFIP International Conference on Dependable Systems and Networks (DSN). https://ieeexplore.ieee.org/stamp/stamp.jsp?tp=&arnumber=6575329 (Year: 2013).‡

Beham et al.. Intrusion Detection and Honeypots in Nested Virtualization Environments, 2013 IEEE.

Park et al.. How To Design Practical Client Honeypots Based on Virtual Environment, 2016 11th Asia Joint Conference on Information Security, pp. 67-73.

\* cited by examiner

‡ imported from a related application

Malware Protection Rule - Windows

| MPMs * | Processes * | Conditions | Objects | Name |

Settings

Activation
[ On ▶ ] — 422

Action
[ Prevention ▶ ] — 424

User Alert
[ Off ▶ ] — 426

Malware Protection Modules (MPMs)

Select the MPMs for this rule:

Child Process Protection

Anti-Ransomware Protection

* Mandatory

[ Save ] [ Apply ] [ Cancel ]

PREVENTING RANSOMWARE FROM ENCRYPTING FILES ON A TARGET MACHINE

CROSS REFERENCE TO OTHER APPLICATIONS

This application is a continuation of U.S. patent application Ser. No. 16/130,636 entitled PREVENTING RANSOMWARE FROM ENCRYPTING FILES ON A TARGET MACHINE filed Sep. 13, 2018, which is incorporated herein by reference for all purposes.

BACKGROUND OF THE INVENTION

Security risks on computing devices are often a result of a bug, design flaw, or other vulnerability in an operating system being exploited by malware, such as ransomware. In the case of ransomware, this can result in encrypted files on a target machine.

Nefarious individuals and organizations are increasingly targeting machines with malicious applications/processes ("malware"), such as ransomware. Unfortunately, it can be difficult to protect against ransomware from encrypting files on a target machine using existing approaches.

BRIEF DESCRIPTION OF THE DRAWINGS

Various embodiments of the invention are disclosed in the following detailed description and the accompanying drawings.

FIGS. 4A and 4B are diagrams of a user interface for preventing ransomware from encrypting files on a target machine in accordance with some embodiments.

DETAILED DESCRIPTION

Figure 1:
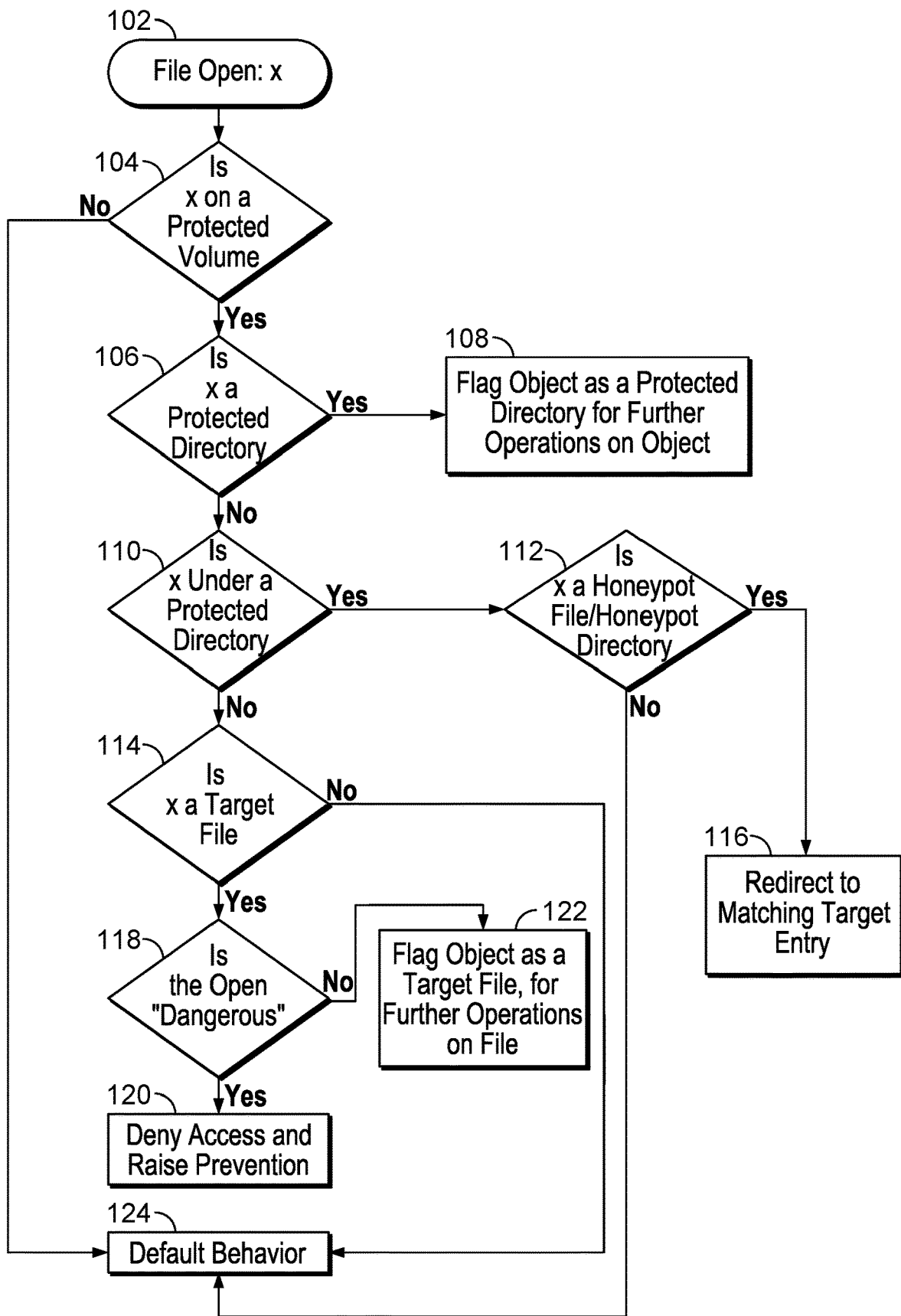
FIG. 1 is a flow diagram of a process in which a file open event is monitored for triggering the processing for preventing ransomware from encrypting files on a target machine that is triggered based on a file open event monitored using the endpoint agent in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Ransomware Security Presents Significant Technical Challenges

Generally, ransomware will enumerate files on any mounted hard disks of a computer system and encrypt files that it deems as interesting to the user(s) (e.g., any files of likely interest to the user(s), which can include local and/or network folders/files). Ransomware will then encrypt the files using a private key, which is not known to the end user(s). As a result, the end user is often confronted with the undesirable choice of paying the ransom in order to decrypt the files or not being able to access the encrypted files (e.g., typically, the encrypted files cannot be decrypted without the private key, thus, forcing the end user to pay the ransom in order to decrypt the files). Ransomware also typically is configured with predefined directories that it will target, before completing a thorough enumeration of all mounted hard drives.

Ransomware will typically save the encrypted data into one of the following: (1) the source file itself; (2) a different file dedicated to the source file; or (3) an accumulative file for all encrypted source files. Once encrypted, the ransomware ensures that the content of a source file will not be retrievable later. For example, the ransomware often will either delete the original/unencrypted source file or modify its content during the encryption processing.

Thus, new and improved technical security solutions to protect against ransomware are needed. Moreover, new and improved techniques are needed to detect and prevent such ransomware mechanisms that can be utilized for encrypting files on a target machine.

Overview of Techniques for Preventing Ransomware from Encrypting Files on a Target Machine Various techniques for preventing ransomware from encrypting files on a target machine are disclosed. For example, various techniques for preventing ransomware from encrypting files on a target machine are disclosed on several different OS environments/platforms, which are applicable to various types of target machines (e.g., desktop computers, laptop computers, tablet computers, smart phones, as well as servers or other types of computing devices).

In some embodiments, a system/process/computer program product for preventing ransomware from encrypting files on a target machine includes monitoring file system activities on a computing device; detecting an unauthorized activity associated with a honeypot file or honeypot folder (e.g., files/folders that are forged by the endpoint agent for detecting ransomware activity on the computing device, such as further described below); and performing an action based on a policy in response to the unauthorized activity associated with the honeypot file or honeypot folder.

In some embodiments, a system/process/computer program product for preventing ransomware from encrypting files on a target machine further includes detecting a file open event associated with the honeypot file, a setting file information event associated with the honeypot file, a writing into a file event associated with the honeypot file, and/or an enumerating a directory event associated with the honeypot folder.

In some embodiments, a system/process/computer program product for preventing ransomware from encrypting files on a target machine further includes generating a plurality of honeypot files and/or a plurality of honeypot folders (e.g., in a protected directory on a protected volume of the target machine).

In some embodiments, a system/process/computer program product for preventing ransomware from encrypting files on a target machine further includes killing a process based on the policy in response to the unauthorized activity associated with a honeypot file or honeypot folder associated with the process.

In some embodiments, a system/process/computer program product for preventing ransomware from encrypting files on a target machine further includes generating an alert based on the policy in response to the unauthorized activity associated with a honeypot file or honeypot folder and/or performing other actions in response to such detected unauthorized activity, such as based on a configured anti-ransomware/security policy.

For example, the disclosed techniques can be applied to detect ransomware before it can encrypt files of potential interest to the user(s) of the target machine. Moreover, the disclosed techniques can be implemented with an insignificant footprint on the target machine thereby reducing the computing storage resource utilized on the protected system/target machine. As further described below, new and innovative techniques are disclosed that can prevent ransomware from encrypting files in a manner that requires a minimal space on hard disks/storage elements/devices of the protected system/target machine, leaves no residue files on the agents' mounted hard disks/storage elements/devices of the protected system/target machine, and has a high probability of blocking ransomware prior to encryption of any essential file(s) stored on the protected system with a minimal disruption to end users (e.g., in which essential file(s) generally refers to files of likely interest to the end users, such as further described below).

Accordingly, new and innovative techniques to prevent ransomware from encrypting files on a target machine are disclosed, which utilize an insignificant amount of storage (e.g., minimal storage requirements on hard disk(s) of a user's machine), leave no residue files on the agents (e.g., agents' storage, such as agents' mounted hard disks), and provide a high probability of blocking ransomware before encryption of any essential file(s) (e.g., any files of likely interest to the user(s)). Moreover, the disclosed techniques can facilitate preventing ransomware from encrypting files on a target machine with a minimal disruption to end users as further described below.

In an example implementation, a kernel mode solution for preventing ransomware from encrypting files on a target machine detects a ransomware module when it is executed on the target machine and attempts to perform a monitored file system related activity as further described below. The kernel mode solution then prevents the ransomware module from deleting/changing the agent's original files (e.g., preventing it from "holding such files for ransom") by terminating the process from which the ransomware module is executed.

As further described below, protected directories generally refer to the directories (e.g., a configurable set of directories) that ransomware will typically deem as interesting and is likely to target files in such directories for encryption (e.g., a user's "My Documents" directory on a Microsoft Windows® operating system (OS) configured machine).

In this example implementation, an endpoint agent can be provided by a lightweight agent (e.g., a commercially available endpoint agent, such as the Palo Alto Networks® Traps' agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS®, and/or Linux OS) to facilitate endpoint security and implement the disclosed techniques for preventing ransomware from encrypting files on a target machine, such as further described below. Specifically, the endpoint agent forges honeypot files in each protected directory (e.g., a directory that is configured to be protected, which can be configurable as a path pattern, such as/documents and/or/photos and/or other directories or path patterns, such as further described below). The endpoint agent can generate its honeypot files with file name extensions that ransomware will typically target for encryption.

In one embodiment, the disclosed kernel mode solution for preventing ransomware from encrypting files on a target machine modifies results for certain file system queries with falsified entries (e.g., spoofed entries as further described below). Specifically, the endpoint agent is configured to manipulate certain file system queries with falsified entries in a way that increases the probability that they will be encrypted by the ransomware first, among all files that the ransomware may target for encryption. As a result, once the ransomware attempts to dispose of and/or modify the original content of those files on the target machine, the disclosed kernel mode solution terminates the process associated with the ransomware (e.g., and/or performs another responsive action(s) based on an anti-ransomware/security policy).

For example, the disclosed kernel mode solution for preventing ransomware from encrypting files on a target machine can detect the ransomware when its process performs at least one of the following operations on the endpoint agent's honeypot files: (1) creates a file handle such that the file will be deleted when the handle is closed; (2) deletes a file; (3) renames a file; and/or (4) writes into a file.

In one embodiment, virtualization on honeypot files is provided to facilitate preventing ransomware from encrypting files on a target machine. An example implementation for utilizing the disclosed honeypot files concept is to write them in each protected directory. However, that approach generally would also include tracking the files across multiple disks (e.g., some that may even be removed from the machine, and mounted into a different machine), which may not be desirable in many situations. Also, given that we generally want to protect a number of distinct directories that may not even exist when the endpoint agent is loaded, that approach would generally include monitoring the creation of such protected directories. As such, in another example implementation, instead of actual creation of physical files on disk, the endpoint agent utilizes the concept of virtual files using a mini filter driver. The concept of virtual files relies on certain actions taken by the mini filter driver as further described below.

In an example implementation, when a process queries a protected directory for its files, the mini filter driver intercepts such queries and adds falsified entries (e.g., spoofed entries) in the output buffer, including describing file names for these honeypot files that do not physically exist on disk (e.g., virtual files that are not physically stored on the disk). Specifically, the mini filter driver falsifies these entries both in the beginning of the directory queries and the end of the directory queries (e.g., spoofs the values for these entries for these virtual files). As a result, this ensures that the honeypot files (e.g., virtual files) will be the first to be targeted by the ransomware for encrypting, if the ransomware either attempts to encrypt files in the order of the query results or in the reverse order of the query results. Thus, the endpoint agent can perform a prevention (e.g., a configured responsive action(s) based on a (anti-ransomware/security) policy) before any attempt to encrypt a real file (e.g., actual, physical file) in a protected directory has been performed by the ransomware.

In this example implementation, when a process attempts to open one of those falsified entries (e.g., attempts to open one of these virtual files), the mini filter driver redirects the request to a specific file residing in a specific folder (e.g., a unique folder) that the endpoint agent maintains on the system storage (e.g., a primary hard disk, such as the hard disk on which the Microsoft Windows® OS is installed). As a result, the process associated with the ransomware opens a handle to a pre-created/forged file added to the hard disk by the endpoint agent (e.g., the endpoint agent's forged honeypot files). In this example implementation, the mini filter driver also tracks I/O requests made on these endpoint agent files, so the endpoint agent can detect a ransomware associated process that attempts to modify these endpoint agent forged honeypot files in one or more of the ways described above.

Accordingly, using the above-described mini filter driver-based techniques, the endpoint agent can falsify files (e.g., spoof the existence of such virtual files) in many protected directories on the file system, using a relatively small number of actual files on disk (e.g., real files on a storage element of the protected system), which can, for example, all reside/be stored within one specific directory on the disk. This also reduces the complexities and computing overhead of having to maintain separate sets of files for each of the protected directories (e.g., upon change of policy, dismounting hard disks or other storage devices, uninstallation, and other complexities that can arise with having to maintain separate sets of files for each of the protected directories).

In one embodiment, content of each of the honeypot files is generally dependent upon the type that they are configured to emulate (e.g., the types of files that they are designed to spoof). For example, the types, names, sizes, and dates can be configurable via a managing server of the endpoint agent solution.

In one embodiment, to address the case in which ransomware (e.g., a ransomware process executing on the protected system) performs a traversal first inside a protected directory, before encrypting the files within that protected directory, the endpoint agent utilizes honeypot directories (e.g., honeypot folders). As further described below, the honeypot directories can be similarly spoofed as falsified entries as part of a protected directory query using the mini filter driver. When opening a honeypot directory, the endpoint agent (e.g., using the mini filter driver, such as further described below) redirects to a real directory on disk (e.g., an actual, physical directory that exists/is stored on a storage element/device of the protected system) that includes the same files that would likely be of interest to a ransomware process. As such, the honeypot files inside this directory can be utilized by the endpoint agent to achieve the same beneficial effect as the honeypot files mentioned before when the ransomware attempts to encrypt them.

Accordingly, the disclosed techniques for preventing ransomware from encrypting files on a target machine provide significant improvements over existing approaches for malware detection as well as over a simple honeypot files solution. For example, the disclosed techniques utilizing virtual honeypot files pose no risk in having file residues on mounted hard disks. Also, the disclosed techniques implemented with virtual honeypot files utilize less space on disk for honeypot files, such as by using the same set/subset of files for all protected directories. In addition, the disclosed techniques provide the ability to show ransom files according to the patterns of protected directory path, without tracking the creation/deletion of those directories. For example, the disclosed solution does not need to track creation of "My documents" folders of new users. Rather, the endpoint agent can simply make sure to show ransom files on all directories whose path matches a given pattern, in this example, that pattern would be *My Documents*. Further, the disclosed techniques provide the ability to decide on the offset of honeypot file entries as part of the enumerated entries in a protected directory (e.g., either first, last, or any other place in the order of the real files in the directory). Finally, the virtual honeypot files can be hidden from the end users to reduce the likelihood of exhibiting honeypot files to interactive users, or for the purpose of not interfering with processes the honeypot files interfere with.

These and other embodiments for preventing ransomware from encrypting files on a target machine will now be further described below.

Embodiments for Preventing Ransomware From Encrypting Files on a Target Machine

FIG. 1 is a flow diagram of a process in which a file open event is monitored for triggering the processing for preventing ransomware from encrypting files on a target machine that is triggered based on a file open event monitored using the endpoint agent in accordance with some embodiments. As shown, FIG. 1 provides an example process for preventing ransomware from encrypting files on a target machine that is based on a file open triggering event (e.g., and can similarly be implemented for a delete a file event) in accordance with some embodiments. In some embodiments, the disclosed process is implemented as a module/component of an endpoint agent. In an example implementation, the endpoint agent can be provided by a lightweight agent (e.g., a commercially available endpoint agent, such as the Palo Alto Networks® Traps' agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS®, and/or Linux OS) to facilitate endpoint security including for preventing ransomware from encrypting files on a target machine, such as further described below.

The disclosed system and process embodiments can detect malware (e.g., unauthorized/undesired processes executing on a target machine) attempting to encrypt files (e.g., honeypot files) on a target machine and perform responsive action(s) (e.g., prevention, alert, user notification, monitor and log, etc.). Specifically, the disclosed system and process embodiments can detect ransomware attempting to encrypt files (e.g., including honeypot files) on a target machine and perform responsive action(s) without significant storage requirements and/or without significant user impact (e.g., such honeypot files are not apparent to the user during typical user activities on the target machine as further described below).

In an example implementation on a Microsoft Windows OS, a kernel-mode solution (e.g., kernel mode on a Windows OS machine) detects a ransomware module executing on a target machine protected by the above-described endpoint agent and prevents it from deleting/changing the target machine's original/non-honeypot files (e.g., or hold them for ransom as discussed above) by terminating the process from which it is executing on the target machine. As discussed above, protected directories can generally be configured to be those directories on the target machine that ransomware will typically deem as interesting and that the ransomware would likely attempt to encrypt files from such directories (e.g., a user's "My Documents" directory on a Windows OS machine).

In this example implementation, the endpoint agent forges honeypot files for each protected directory (e.g., configurable as a path pattern). For example, the endpoint agent can be configured to generate a set of honeypot files with file name extensions and file contents that ransomware will often target for encryption. Specifically, the disclosed kernel-mode solution manipulates file system queries' results with falsified entries (e.g., intercepts file system queries and spoofs the responses to certain file system queries as described herein), in a way that heightens probability that they will be selected for encryption by the ransomware first/prior to selecting other files on the target machine for encryption (e.g., the target machine's original/non-honeypot files). As a result, once a ransomware associated process attempts to dispose of the original content of those files that are most likely the honeypot files forged by the endpoint agent, then the endpoint agent can detect such activities on the target machine and terminate the ransomware associated process(es) executing on the target machine and/or perform one or more responsive activities (e.g., prevention, alert, user notification, monitor and log, etc., which can be configured responsive actions based on various criteria).

In this example implementation, the virtual files can be generated with headers and a time stamp (e.g., a spoofed time stamp value can be manipulated to make the file appear to be a relatively recently created file) and a fake file size (e.g., the forged file can add garbage value after the header). In addition, this can be implemented to be dynamic so that the endpoint agent can even create fake/spoofed headers for new file types not previously known when the endpoint agent was released.

In this example implementation, the names of the virtual files can be generated to be unique on the file system and, thus, would be difficult for malware to detect as fake file names. For example, the file names can be generated using random, dictionary generated techniques (e.g., if there exists a collision between a real actual file and the virtual/honeypot file, then the mini filter driver can be configured to show the real file as opposed to the virtual/honeypot file).

In this example implementation, the disclosed endpoint agent detects the ransomware when its process performs at least one of the following file system related operations on a honeypot file(s): (1) creates a file handle such that the file will be deleted when the handle is closed; (2) deletes a file; (3) renames a file; and/or (4) writes into a file.

In this example implementation, virtualization of honeypot files is utilized to facilitate a more robust solution across various system environments. As previously discussed, another implementation of the honeypot files would have been to write them in any protected directory on the target system. However, that approach would potentially require tracking the files across multiple disks (e.g., some that may even be removed from the machine and mounted into a different machine). Also, given that we generally want to protect a number of distinct directories on the protected volume of the target system that may not even exist when the endpoint agent is initially loaded/installed on the system would generally require the endpoint agent to monitor the creation of such protected directories.

In another example implementation, instead of actual creation of files on disk, the endpoint agent employs the concept of virtual files using its mini filter driver. This concept of virtual files can be implemented utilizing the mini filter driver to monitor/intercept certain file system related actions/requests and providing certain modified responses (e.g., spoofed responses to certain file system related actions/requests, such as similarly described above and further described below).

First, when a process queries a protected directory for its files, the mini filter adds falsified entries (e.g., spoofed entries) in the output buffer, describing file names that do not physically exist on the disk of the system. The mini filter driver falsifies these entries both in the beginning of the directory queries and the end of the directory. This increases the probability that the honeypot files would be the first targeted for encryption by the ransomware if the ransomware either encrypts files in the order of the query results or in reverse order of the query results. Thus, the endpoint agent can perform a prevention or other responsive action prior to any attempt by the ransomware to encrypt an actual, physical file in a protected directory.

Second, when a process attempts to open one of those falsified entries, the mini filter driver redirects the request to a specific file residing in a specific and unique folder (e.g., in an example implementation, in different protected directories, entries can be mapped to the same file; but in the same protected directory, every file (or every two files, if you take each corresponding beginning and end file entry) can be redirected into a different file on disk) that the endpoint agent maintains on a primary storage unit of the protected system (e.g., a hard disk on which the Microsoft Windows OS or other OS is installed on the target system). Hence, the process in fact opens a handle to a pre-created/forged honeypot file.

Third, the mini filter driver monitors input/output (I/O) requests (e.g., IRP (I/O) request packets on an example Microsoft Windows OS implementation) made on such honeypot files (e.g., forged honeypot files). As a result, the endpoint agent using the mini filter driver can detect ransomware executing on the target machine if a process associated with the ransomware attempts to access/modify the honeypot files (e.g., forged honeypot files) in one of the ways described above.

As such, using the above-described virtual files implemented by the endpoint agent using its mini filter driver, the endpoint agent can falsify files in many protected directories on the file system of the protected system using, for example, only a handful of actual files on disk, which can all reside within one specific directory on disk. Accordingly, the disclosed techniques facilitate reducing the computer storage space utilized for these honeypot files as well as saving the computing overhead and complexities of maintaining all those honeypot files (e.g., upon change of policy, dismounting hard disks, uninstallation, etc.).

The content of the actual honeypot files on disk is generally dependent upon the type that they masquerade as. For example, the types, names, sizes, and dates can each be configured via a managing server of the disclosed endpoint agent solution. This behavior can be configured in a policy (e.g., security/anti-ransomware policy), so that the endpoint agent performs the disclosed anti-ransomware techniques when certain conditions apply on a process (e.g., or thread) that performs the queries/opens as similarly described above. For example, a policy can be configured such that the endpoint agent will not perform these actions on processes that are executing from specific paths that have specific data in their binaries (e.g., their PE), or that have their binary file signed, such as further described herein.

To address the case where a ransomware associated process would attempt to perform a traversal first inside a protected directory prior to encrypting the files within that protected directory, the endpoint agent also employs the concept of honeypot directories. In an example implementation, the honeypot directories are similarly provided as falsified entries as part of a protected directory query. When opening a honeypot directory, the endpoint agent utilizing the mini filter driver redirects to a real directory on disk with the same files that should be of likely interest to ransomware. As such, honeypot directories can provide the same effect as honeypot files by facilitating advanced detection of ransomware activities on the target machine when the ransomware attempts to encrypt them, which can then be detected by the endpoint agent using the disclosed techniques.

Real users who are using programs that show files on the file system (e.g., explorer.exe on a Microsoft Windows OS machine, which is used by any user logged in to a Windows session) may be alarmed to observe the existence of unfamiliar files in directories that are not a program directory. For example, "My Documents" is considered a dedicated directory for the user to store their own private files. As such, the existence of other files in that directory may be troublesome to end users, and they may even attempt to delete them, which would trigger false positives for the detection of ransomware activity by the endpoint agent. Most of the non-savvy end-users will face this issue when using graphical user interface (GUI) processes that enumerate files using, for example, Microsoft Windows OS shell APIs.

Accordingly, as discussed above, the honeypot files can be hidden from end users in accordance with some embodiments. For example, given that ransomware is generally much less likely to use shell APIs in order to enumerate and open files, legitimate directory open activities can be distinguished from potential malicious directory open activities on the protected machine. In an example implementation, upon an open request to a protected directory, the endpoint agent performs a stack walk on the user mode part of the request and searches for a return address in the stack (i.e., the address space of a Dynamic-Link Library (DLL) that handles shell related APIs). If a return address is found, the request is deemed legitimate, and further enumeration queries upon resulting handle will not have falsified entries within them. The endpoint agent maintains a closed set of these shell related DLLs (e.g., example GUI/shell related DLLs on the Microsoft Windows OS include shlwapi.dll, shcore.dll, comdlg32.dll) and maintains their addresses in any executing process.

Referring to FIG. 1, at 102, a file open event x is detected on a target system. For example, the file system event associated with x (e.g., x can be a directory or a file) can be detected using the mini filter driver as described above.

At 104, whether x is on a protected volume (e.g., the configuration can be based on the volume's drive letter and/or other criteria/attributes) is determined. For example, the endpoint agent can be configured with a set of protected volumes on the target system as similarly described above. If x is not a protected volume, then processing proceeds to 124.

At 106, whether x is a protected directory is determined. For example, the endpoint agent can be configured with a set of protected directories on the target system as described above. If x is a protected directory, then the endpoint agent flags the object as a protected directory for further operations on the object as shown at 108.

Otherwise (i.e., x is not a protected directory), processing continues at 110, and whether x is under a protected directory is determined. For example, x can be a file, and the endpoint agent can be configured with a set of protected directories on the target system as described above. If x is under a protected directory, then the endpoint agent determines whether x is a honeypot file or a honeypot directory as shown at 112. If x is a honeypot file or a honeypot directory, then the endpoint agent redirects to a matching target entry as shown at 116 using the virtual file implementation of honeypot files/directories as similarly described above. Otherwise (i.e., x is not a honeypot file or a honeypot directory), processing continues at 124. Back to otherwise close of 110, i.e., x is not under a protected directory, processing continues at 114.

At 114, whether x is a target file (e.g., forged honeypot file) is determined. If x is a target file, then the endpoint agent determines whether file open of the file x is dangerous as shown at 118. If the endpoint agent determines that the file open of the file x is dangerous, then the endpoint agent denies access and raises a prevention at 120. Otherwise (i.e., the endpoint agent determines that the file open of the file x is not dangerous), then the endpoint agent flags the object as a target file for further operations on the file at 122. Returning to 114, if x is not a target file, then the endpoint agent allows for the default file system behavior to be performed (e.g., normal processing is performed without endpoint agent intervention) as shown at 124.

Figure 2A:
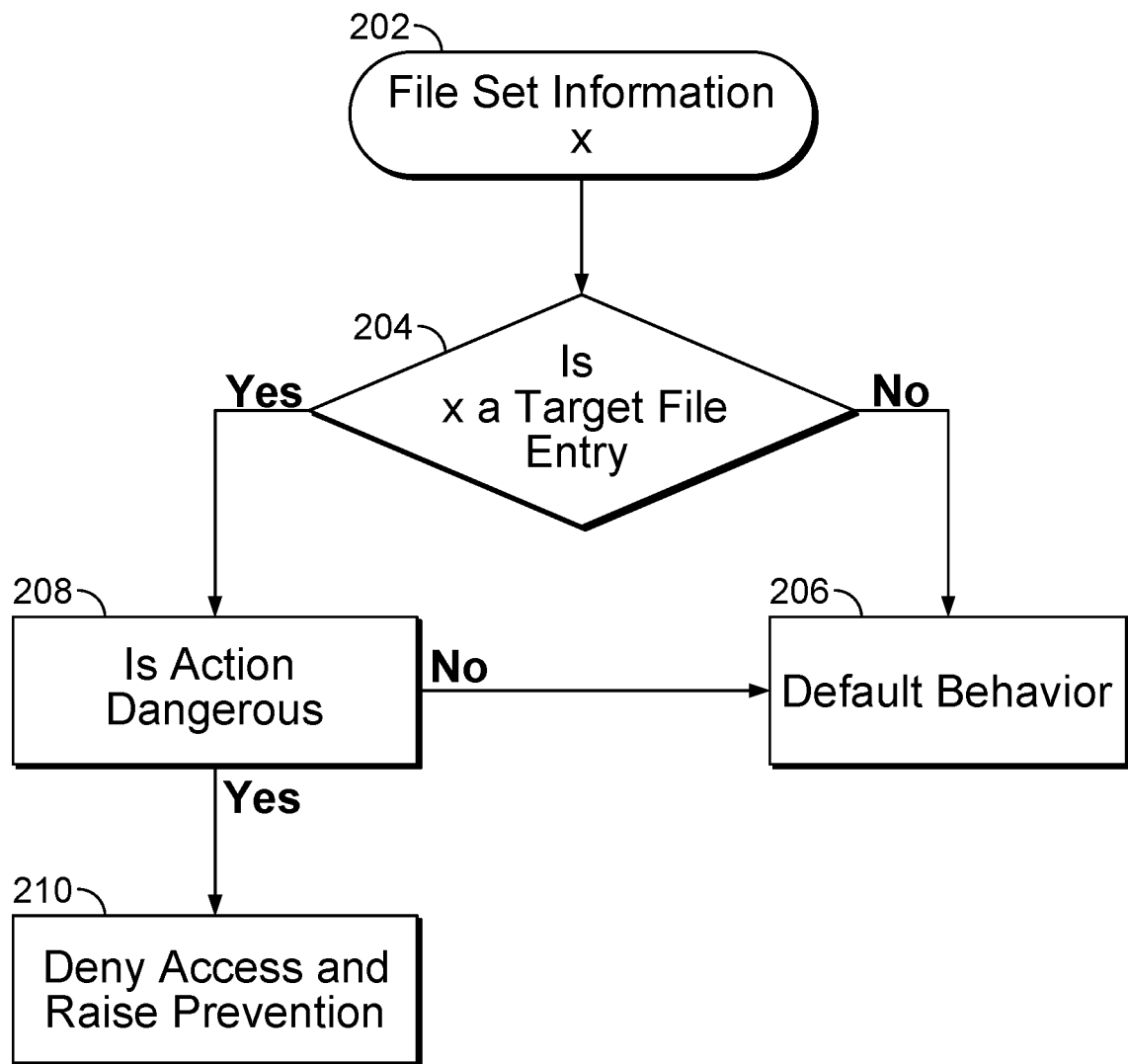
FIG. 2A is a flow diagram of a process in which a setting file information event is monitored for triggering the processing for preventing ransomware from encrypting files on a target machine that is triggered based on a setting file information event monitored using the endpoint agent in accordance with some embodiments.

FIG. 2A is a flow diagram of a process in which a setting file information event is monitored for triggering the processing for preventing ransomware from encrypting files on a target machine that is triggered based on a setting file information event monitored using the endpoint agent in accordance with some embodiments. As shown, FIG. 2A provides an example process for preventing ransomware from encrypting files on a target machine that is based on a setting file information triggering event (e.g., and can similarly be implemented for a rename file or delete a file event) in accordance with some embodiments. In some embodiments, the disclosed process is implemented as a module/component of an endpoint agent. In an example implementation, the endpoint agent can be provided by a lightweight agent (e.g., a commercially available endpoint agent, such as the Palo Alto Networks® Traps' agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS®, and/or Linux OS) to facilitate endpoint security including for preventing ransomware from encrypting files on a target machine, such as further described below.

Referring to FIG. 2A, at 202, a file set information event x is detected on a target system. For example, the file set information event associated with x can be detected using the mini filter driver as described above.

At 204, whether x is a target file entry is determined. If x is not a target file entry, then the endpoint agent allows for the default file system behavior to be performed (e.g., normal processing is performed without endpoint agent intervention) as shown at 206.

If x is a target file entry, then the endpoint agent determines whether the action (i.e., file set information of the file x) is dangerous as shown at 208. If the endpoint agent determines that the file set information of the file x is dangerous, then the endpoint agent denies access and raises a prevention at 210. Otherwise (i.e., the endpoint agent determines that the file set information of the file x is not dangerous), then the endpoint agent allows for the default file system behavior to be performed (e.g., normal processing is performed without endpoint agent intervention) as shown at 206.

Figure 2B:
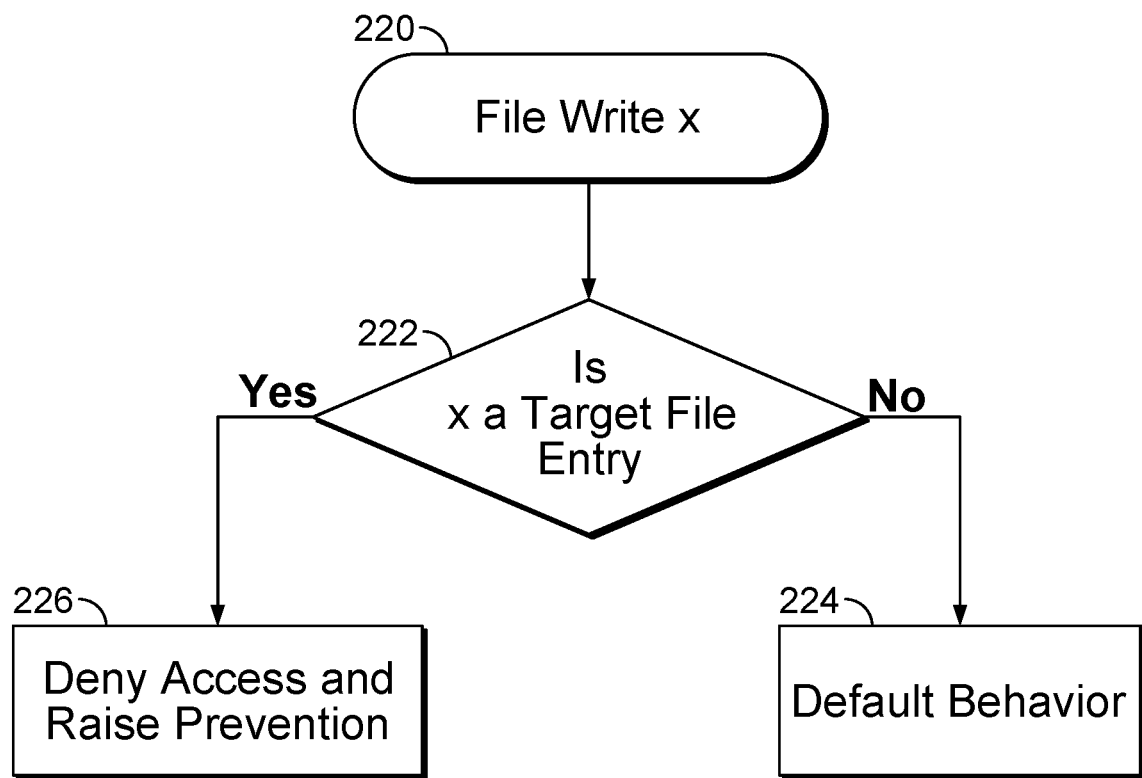
FIG. 2B is a flow diagram of a process in which a writing into a file event is monitored for triggering the processing for preventing ransomware from encrypting files on a target machine that is triggered based on a writing into a file event monitored using the endpoint agent in accordance with some embodiments.

FIG. 2B is a flow diagram of a process in which a writing into a file event is monitored for triggering the processing for preventing ransomware from encrypting files on a target machine that is triggered based on a writing into a file event monitored using the endpoint agent in accordance with some embodiments. As shown, FIG. 2B provides an example process for preventing ransomware from encrypting files on a target machine that is based on a writing into a file event in accordance with some embodiments. In some embodiments, the disclosed process is implemented as a module/component of an endpoint agent. In an example implementation, the endpoint agent can be provided by a lightweight agent (e.g., a commercially available endpoint agent, such as the Palo Alto Networks® Traps' agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS®, and/or Linux OS) to facilitate endpoint security including for preventing ransomware from encrypting files on a target machine, such as further described below.

Referring to FIG. 2B, at 220, a file write event x is detected on a target system. For example, the file write event associated with x can be detected using the mini filter driver as described above.

At 222, whether x is a target file entry is determined. If x is not a target file entry, then the endpoint agent allows for the default file system behavior to be performed (e.g., normal processing is performed without endpoint agent intervention) as shown at 224. If x is a target file entry, then the endpoint agent denies access and raises a prevention at 226.

Figure 2C:
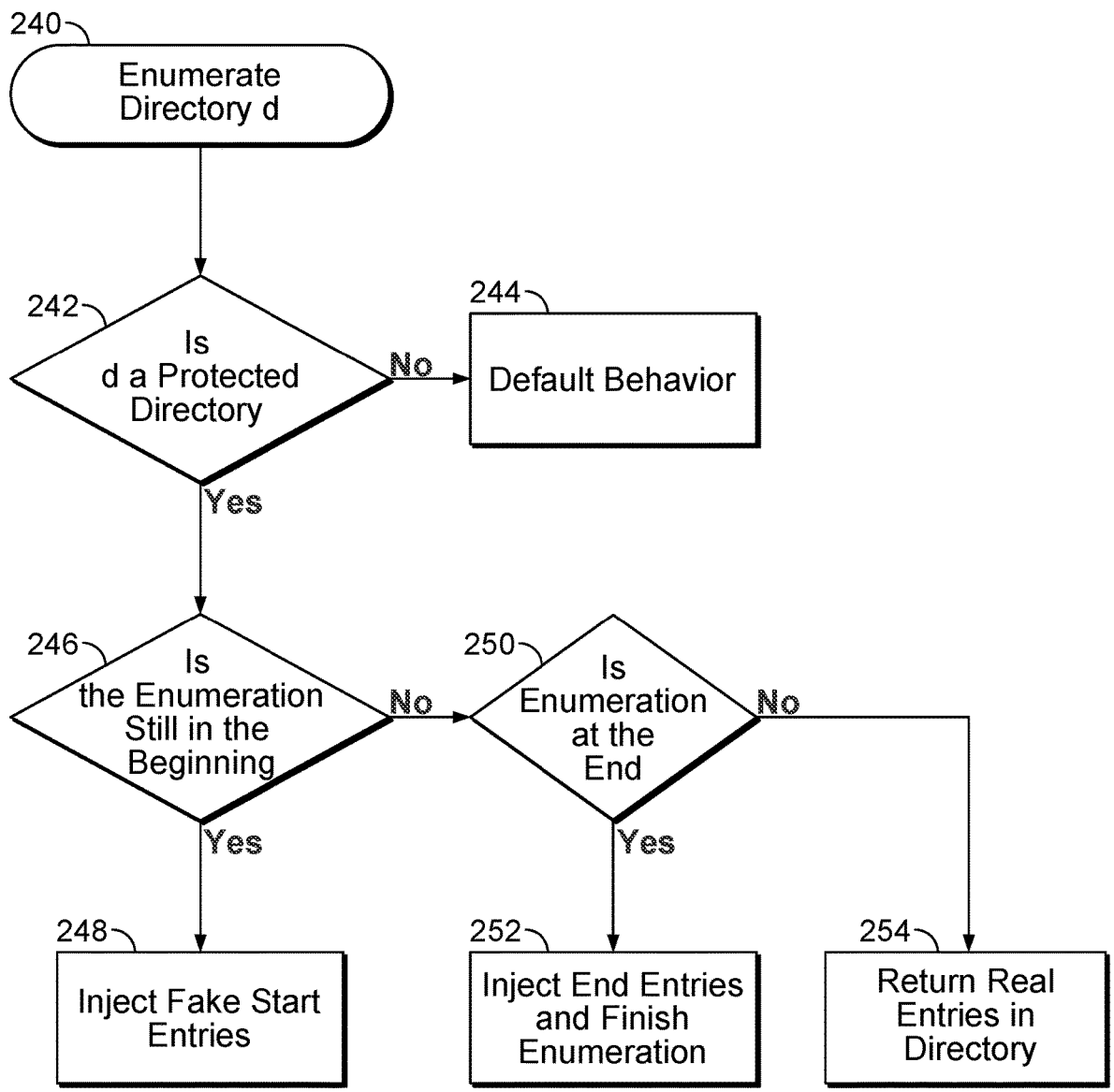
FIG. 2C is a flow diagram of a process in which an enumerating a directory event is monitored for triggering the processing for preventing ransomware from encrypting files on a target machine that is triggered based on an enumerating a directory event monitored using the endpoint agent in accordance with some embodiments.

FIG. 2C is a flow diagram of a process in which an enumerating a directory event is monitored for triggering the processing for preventing ransomware from encrypting files on a target machine that is triggered based on an enumerating a directory event monitored using the endpoint agent in accordance with some embodiments. As shown, FIG. 2C provides an example process for preventing ransomware from encrypting files on a target machine that is based on an enumerating a directory triggering event in accordance with some embodiments. In some embodiments, the disclosed process is implemented as a module/component of an endpoint agent. In an example implementation, the endpoint agent can be provided by a lightweight agent (e.g., a commercially available endpoint agent, such as the Palo Alto Networks® Traps' agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS®, and/or Linux OS) to facilitate endpoint security including for preventing ransomware from encrypting files on a target machine, such as further described below.

Referring to FIG. 2C, at 240, an enumerating a directory event d is detected on a target system. For example, the enumerate a directory event associated with d can be detected using the mini filter driver as described above.

At 242, whether d is a protected directory is determined. If d is not a protected directory, then the endpoint agent allows for the default file system behavior to be performed (e.g., normal processing is performed without endpoint agent intervention) as shown at 244.

If x is a protected directory, then the endpoint agent determines whether the enumeration is at the beginning of the directory as shown at 246. If so (i.e., enumeration is at the beginning of the directory), then the endpoint agent injects fake start entries (e.g., utilizes the mini filter driver to inject spoofed entries at the beginning of the directory enumeration results as similarly described above) as shown at 248. Otherwise, the endpoint agent determines whether the enumeration is at the end of the directory as shown at 250. If so (i.e., enumeration is at the end of the directory), then the endpoint agent injects fake end entries and finishes the enumeration (e.g., utilizes the mini filter driver to inject spoofed entries at the end of the directory enumeration results as similarly described above) as shown at 252. Otherwise (i.e., enumeration is not at the beginning or at the end), the real/actual entries in the directory are returned (e.g., normal processing is performed without endpoint agent intervention) as shown at 254.

The above work flows for processing different triggers for anti-ransomware protection on a target machine provide an example overview of the disclosed techniques for a subset of the example monitored file system activities as described herein. As will now be apparent to one of ordinary skill in the art in view of these example process embodiments, there are many different use cases in which, for example, only some of the processes may be protected while some may be excluded from the flow. These disclosed techniques can also be implemented to address other use cases, such as for file opens using File IDs (e.g., a Microsoft Windows OS (NTFS) environment also allows use of a File ID for opening a file, so the mini filter driver can be implemented to also provide a unique File ID as well as a virtual/fake file name for the forged honeypot files) as well as use cases involving an intersection between a real, actual physical file on disk and a honeypot file.

In some embodiments, an exceptions list (e.g., whitelist) of processes is configured for the endpoint agent, such as further described below. These processes will be excluded from the above-described anti-ransomware intervention and will automatically be allowed to perform default processing without triggering endpoint agent intervention as described above.

An example system architecture including components for implementing the above-described endpoint agent for preventing ransomware from encrypting files on a target machine is described below.

Figure 3:
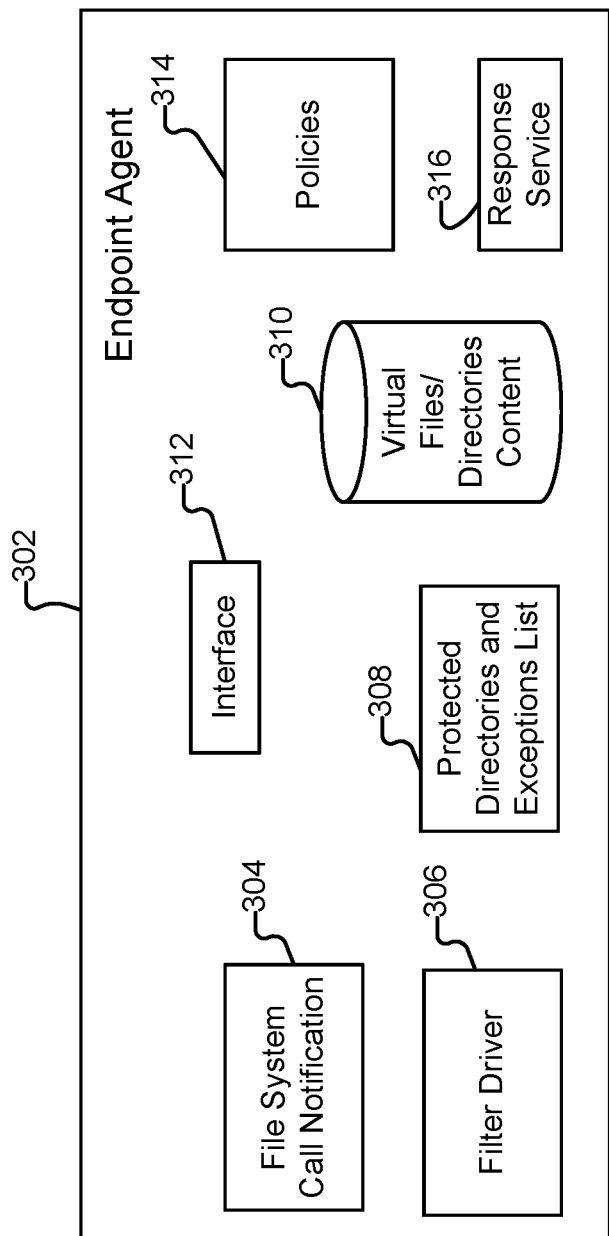
FIG. 3 is a component diagram of an endpoint agent for preventing ransomware from encrypting files on a target machine in accordance with some embodiments.

Component Diagram of an Endpoint Agent for Preventing Ransomware From Encrypting Files on a Target Machine FIG. 3 is a component diagram of an endpoint agent for preventing ransomware from encrypting files on a target machine in accordance with some embodiments. As shown, FIG. 3 provides example components/modules of an endpoint agent for preventing ransomware from encrypting files on a target machine in accordance with some embodiments. In some embodiments, the disclosed system is implemented as a module/component of an endpoint agent, such as similarly described above with respect to FIGS. 1 and 2A-C. In an example implementation, the endpoint agent can be provided by a lightweight agent (e.g., a commercially available endpoint agent, such as the Palo Alto Networks® Traps' agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS, and/or Linux OS) to facilitate endpoint security and protection against ransomware, such as further described below.

Referring to FIG. 3, an endpoint agent 302 includes various components (e.g., modules implemented in executable code) for implementing the disclosed anti-ransomware techniques. For example, the endpoint agent can be implemented using one or more high level programming languages (e.g., Python, C, Java, C++, C#, R, JavaScript, PHP, Go, Swift, and/or other programming languages and/or in various programmable hardware/ASIC or other components). As shown, endpoint agent 302 includes a plurality of modules that include the executable code for performing the disclosed anti-ransomware techniques as will now be further described.

As shown in FIG. 3, endpoint agent 302 includes an example module to perform file system call/event monitoring as similarly described above with respect to FIGS. 1 and 2A-C implemented using a file system call notification module 304 (e.g., configured file system events to be monitored can be maintained by this component, such as for the following example file system event notifications: file open, setting file information, writing into a file, and enumerating a directory, as similarly described above). Endpoint agent 302 also includes an example module to perform file system activity related monitoring as similarly described above with respect to FIGS. 1 and 2A-C implemented using a filter driver 306 (e.g., a mini filter driver). Both modules 304 and 306 facilitate the file system event related monitoring and can be implemented using a flow(s) which results in preventions as similarly described above with respect to FIGS. 1 and 2A-C. Another example module can include the configured protected directories and the configured exceptions list (e.g., whitelist of processes) as similarly described above with respect to FIGS. 1 and 2A-C and further described below, which is shown as a protected directories and exceptions list component 308. A virtual files/directories content data store is shown at 310, which can store the content to be utilized for the virtual implementation of the honeypot files and honeypot directories as similarly described above with respect to FIGS. 1 and 2A-C. An interface module 312 (e.g., user interface, such as a GUI, command line interface, and/or other interface design, which can facilitate configuration of policy settings, provide user alerts, access to log files of monitored processes, and/or API/CLI mechanisms for updates and configurations such as with a managing server for endpoint agents as similarly described herein) is another example module that provides the interface functionality as similarly described above with respect to FIGS. 1 and 2A-C and further described below with respect to FIGS. 4A-B. As also shown in FIG. 3, another example module includes a configuration/policy module for the disclosed anti-ransomware techniques provided by the endpoint agent as similarly described above with respect to FIGS. 1 and 2A-C, which is implemented by policies (e.g., a security/anti-ransomware policy) 314. A response service 316 is another example module that performs responsive actions, such as raising a prevention/terminating a process, as similarly described above. As will now be apparent, various other components/modules and architectures can similarly be implemented to perform the disclosed anti-ransomware techniques.

In an example implementation, the configured protected directories (e.g., shown as protected directories component and exceptions list component 308 in FIG. 3) can include full and/or relative paths for the protected directories (e.g., the protected directory can be a full or relative path and can support also utilizing patterns to match user directories not known in advance).

For example, for the Microsoft Windows OS, various folders can be configured as protected directories, such as the desktop folder, downloads folder, my documents folder, and my pictures/videos folders. Either full and/or relative paths can be similarly configured for the protected directories. For example, the pattern % ProfilesDirectory %\*?\Downloads\, will apply to all Download folders of any user. In this case, % ProfilesDirectory % is wherever the profiles directory exists (i.e., c: \users).

As will be apparent, additional or different directories can be configured to be included in the configured protected directories, which will also vary based on OS type and version and/or other system configuration and security considerations and criteria.

In an example implementation, the configured exceptions list (e.g., shown as protected directories and exceptions list component 308 in FIG. 3) can include an exceptions list of processes exempt from the disclosed anti-ransomware inspection and processing techniques. In an example implementation on the Microsoft Windows OS, an example exceptions list (e.g., whitelist) of processes can be implemented by the endpoint agent, which can include various processes, such as desktopmgr.exe, explorer.exe, and/or outlook.exe. In another example implementation, the configured exceptions list can be based on paths (either strict or patterns) of processes, or attributes of processes' binaries content and/or other criteria/attributes. As will be apparent, additional or different processes can be configured to be included in the exceptions list of processes, which will also vary based on OS type and version and/or other system configuration and security considerations and criteria.

In an example implementation, the mini filter driver (e.g., filter driver 306 in FIG. 3) can be configured with a set of call back registrations for monitoring various file system events. In an example implementation on a Microsoft Windows OS, below are the IRPs whose callback is registered to by the mini filter driver.

IRP_MJ_CREATE: Used to intercept honeypot files/directories openings (e.g., both the virtual files, in order to redirect them, and the actual, real files on disk, and also can intercept opening of protected directories).

IRP_MJ_SET_INFORMATION: Used for renaming/deleting files.

IRP_MJ_WRITE: Used for intercepting file writes.

IRP_MJ_NETWORK_QUERY_OPEN: Used to disallow fastIO so that all IO will pass through the mini filter driver to facilitate monitoring of certain file system activities as similarly described above.

IRP_MJ_DIRECTORY_CONTROL: Used to inject false entries (e.g., spoofed entries) into the protected directories as similarly described above.

In this example implementation, the endpoint agent is also configured to receive notifications of newly loaded volumes. As such, the endpoint agent can protect newly loaded volumes as well (e.g., in case a user mounts a USB after the Microsoft Windows OS has loaded). For example, the endpoint agent can receive newly loaded volumes notification by setting a PFLT_INSTANCE_SETUP_CALLBACK of FLT_REGISTRATION for the mini filter driver.

In some embodiments, the prevention and termination actions are configurable. For example, user/GUI notifications can also be configurable in the endpoint agent.

In some embodiments, policies can be updated periodically. For example, if a new file type (e.g., file extension) is released/developed, then the new file type/extension can be updated and new honeypot files with appropriate content for that new file type/extension can be forged and deployed by the endpoint agent on a protected system.

While the above-described embodiments refer generally to Microsoft Windows OS environments, the disclosed anti-ransomware techniques can be similarly implemented on various other OS environments, such as the Apple Mac® OS, Apple iOS, and/or Linux OS as will now be apparent to one of ordinary skill in the art in view of the disclosed embodiments.

Example user interface embodiments for preventing ransomware from encrypting files on a target machine will now be further described below.

Figure 4A:
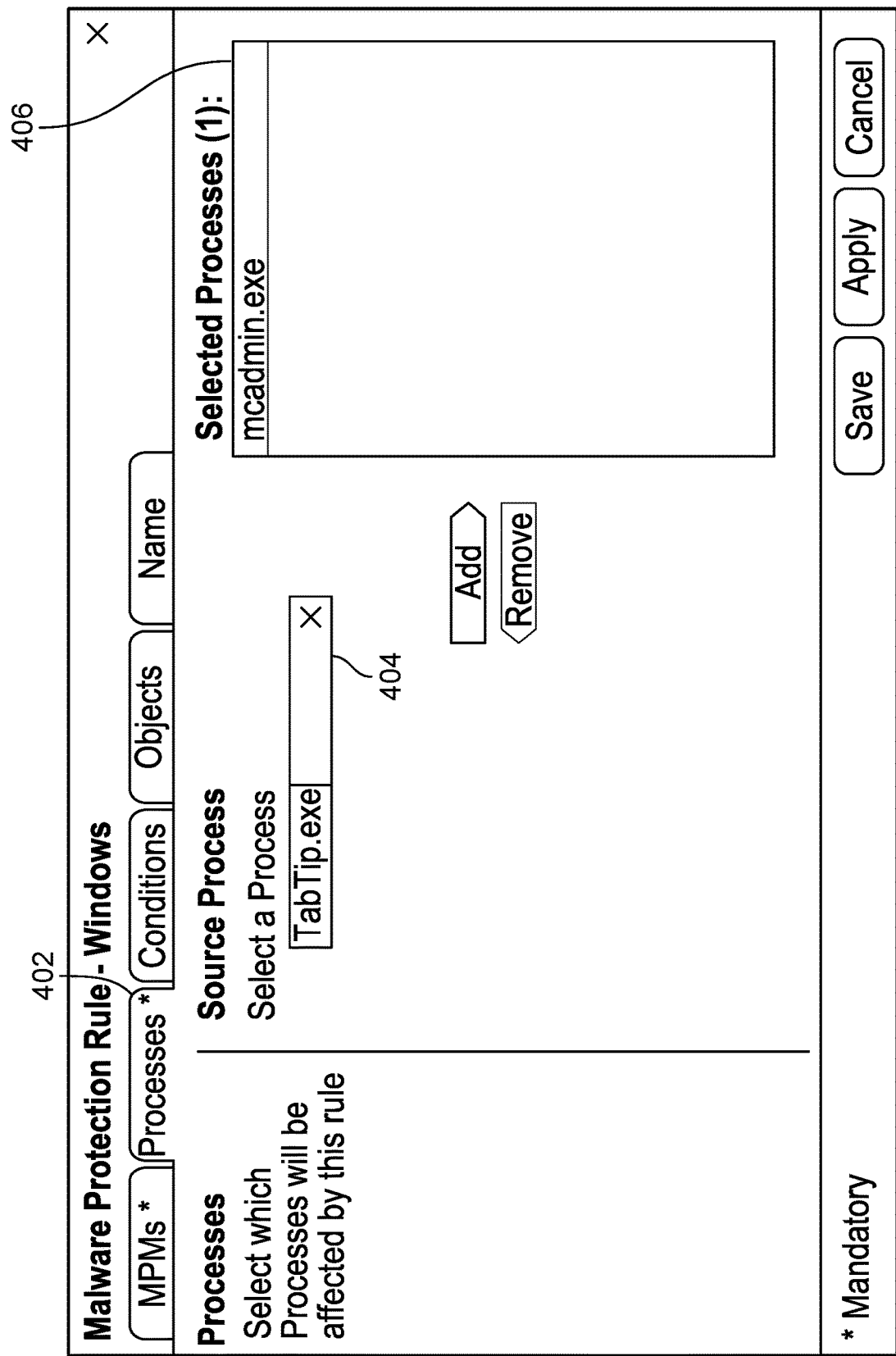

User Interface Embodiments for Preventing Ransomware from Encrypting Files on a Target Machine FIGS. 4A and 4B are diagrams of a user interface for preventing ransomware from encrypting files on a target machine in accordance with some embodiments. As shown, FIGS. 4A and 4B each provide an example graphical user interface (GUI) for configuring rules for protection against ransomware for the Microsoft Windows OS implementation of the endpoint agent in accordance with some embodiments. In some embodiments, the disclosed system is implemented as a module/component of an endpoint agent, such as similarly described above with respect to FIGS. 1-3. In an example implementation, the endpoint agent can be provided by a lightweight agent (e.g., a commercially available endpoint agent, such as the Palo Alto Networks® Traps' agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS, and/or Linux OS) to facilitate endpoint security and ransomware protection, such as further described below.

As similarly described above, an endpoint agent can be implemented that performs the disclosed techniques for protection against ransomware. In an example implementation, the endpoint agent can also include a user interface/GUI to allow users to create or edit rules for policies for protection against ransomware as further described below. Configuration/policy settings can be distributed to deployed agents using a heartbeat or other update mechanisms for agents deployed across a network (e.g., an enterprise and/or cloud-based network of computing devices).

In an example implementation, when creating or editing a rule, the following values can be configured: Activation (On/Off); Action (Prevention/Notification); User Alert (On/Off); and Processes (Select a process). The default policy for this module is as follows: Activation: On; Action: Prevention; User Alert: On; Processes: All processes (except for known applications, such as the configured exceptions/whitelist as similarly described above).

Referring to FIG. 4A, a user interface/GUI (e.g., Malware Protection Rule—Windows screen) includes a processes tab 402, and a screen that includes configurable source processes that can be selected as shown at 404 and added as selected processes as shown at 406.

Referring to FIG. 4B, the user interface/GUI includes an MPMs (e.g., Malware Protection Modules (MPMs)) tab 420, an Activation menu (e.g., On or Off can be configured using this menu) 422, an Action menu (e.g., Prevention or Notification can be configured using this menu) 424, and a User Alert menu (e.g., On or Off can be configured using this menu) 426.

In this example implementation, when a security event is sent to an Enterprise System Management (ESM) entity, the security event can include one or more of the following values: Event Type: Anti-Malware (MPM); Module: Anti Ransomware Protection; Action, Computer Name, User Name, Agent Version, and Content Version; Source Process: the malicious process that tried to modify the protected honeypot files; Process Hash: the hash of the malicious process; Additional Information: information about the folders\files that the malicious application attempted to modify; Prevention XML: contains also the blocked operation, the path of the blocked file, the target path (if the operation was 'rename'), in order to better be able to analyze the prevention; and/or an SIEM event will be created by this security event and its severity will be critical.

As will now be apparent, the disclosed anti-ransomware techniques can be implemented using various user interfaces/GUI designs on various OS environments on endpoint devices including those described above and can be similarly implemented on various other OS environments, including mobile, desktop, and server computing devices as well as cloud-based computing environments.

Additional example processes for the disclosed techniques for performing privilege escalation protection will now be described.

Figure 5:
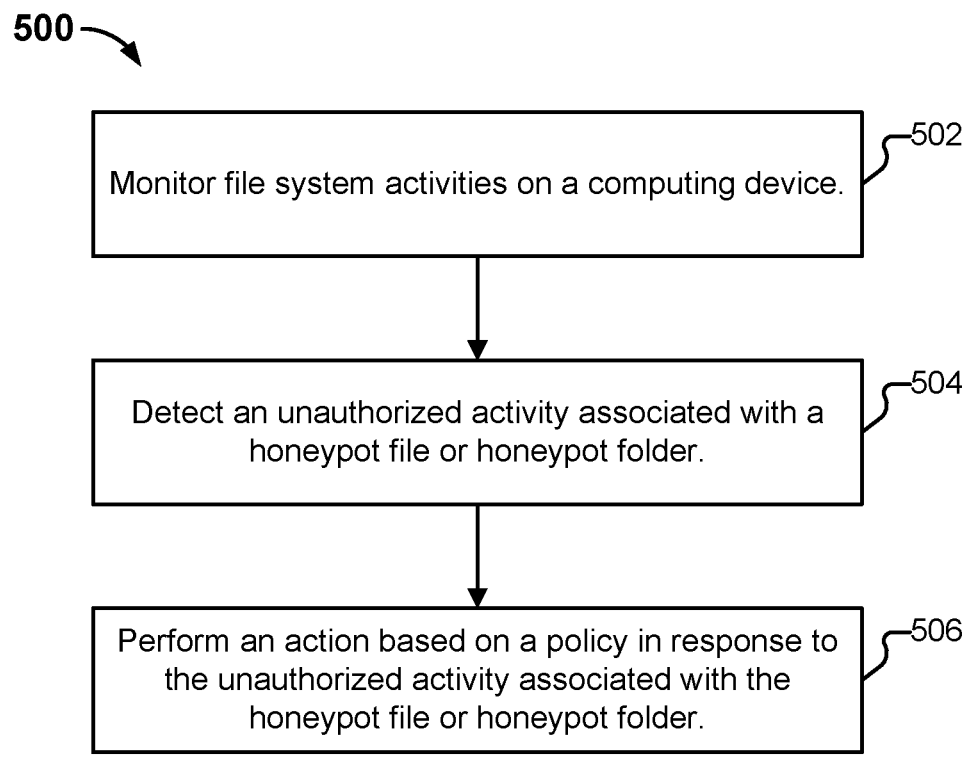
FIG. 5 is a flow diagram of a process for preventing ransomware from encrypting files on a target machine in accordance with some embodiments.

Additional Process Embodiments for Preventing Ransomware From Encrypting Files on a Target Machine FIG. 5 is a flow diagram of a process for preventing ransomware from encrypting files on a target machine in accordance with some embodiments. In some embodiments, a process 500 as shown in FIG. 5 is performed by the security platform and techniques as similarly described above including the embodiments described above with respect to FIGS. 1-4B. In one embodiment, process 500 is performed by an endpoint agent/module as described above with respect to FIGS. 1-3, as similarly described above.

The process begins at 502. At 502, monitoring file system activities on a computing device is performed. For example, an endpoint agent can monitor file system activities on an endpoint device (e.g., using a filter driver, such as the disclosed mini filter driver) as similarly described above.

At 504, detecting an unauthorized activity associated with a honeypot file or honeypot folder is performed. For example, the unauthorized activity can be determined using the anti-ransomware techniques as similarly described above.

At 506, performing an action based on a policy in response to the unauthorized activity associated with the honeypot file or honeypot folder is performed. For example, a protection action/response can be performed based on the policy (e.g., anti-ransomware/security policy), such as a prevention (e.g., killing the process), alerting the user, and/or monitoring the process and logging the process activities monitored on the endpoint device as similarly described above.

Figure 6:
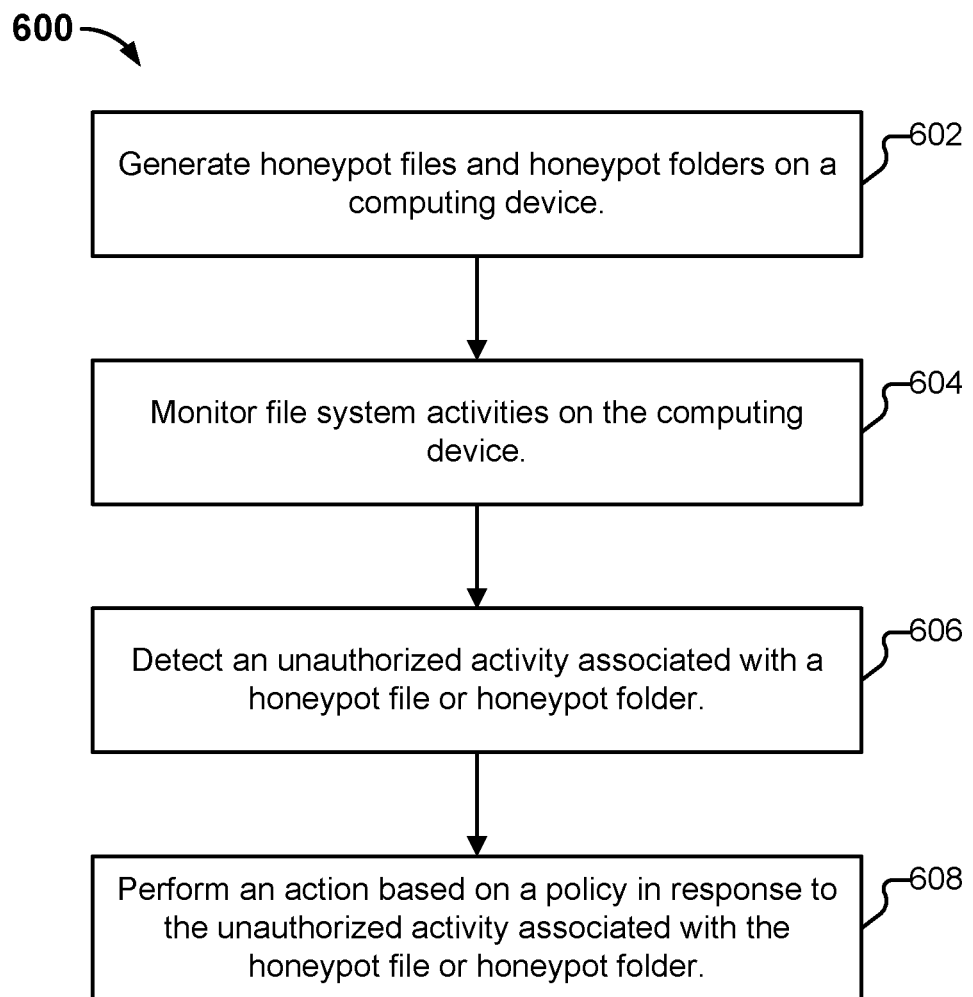
FIG. 6 is another flow diagram of a process for preventing ransomware from encrypting files on a target machine in accordance with some embodiments.

FIG. 6 is another flow diagram of a process for preventing ransomware from encrypting files on a target machine in accordance with some embodiments. In some embodiments, a process 600 as shown in FIG. 6 is performed by the security platform and techniques as similarly described above including the embodiments described above with respect to FIGS. 1-4B. In one embodiment, process 600 is performed by an endpoint agent/module as described above with respect to FIGS. 1-3, as similarly described above.

The process begins at 602. At 602, generating honeypot files and honeypot folders on a computing device is performed. For example, an endpoint agent can generate virtual files and virtual folders for protected directories on the computing device as similarly described above.

At 604, monitoring file system activities on a computing device is performed. For example, the endpoint agent can monitor file system activities on an endpoint device (e.g., using a filter driver, such as the disclosed mini filter driver) as similarly described above.

At 606, detecting an unauthorized activity associated with a honeypot file or honeypot folder is performed. For example, the unauthorized activity can be determined using the anti-ransomware techniques as similarly described above.

At 608, performing an action based on a policy in response to the unauthorized activity associated with the honeypot file or honeypot folder is performed. For example, a protection action/response can be performed based on the policy (e.g., anti-ransomware/security policy), such as a prevention (e.g., killing the process), alerting the user, and/or monitoring the process and logging the process activities monitored on the endpoint device as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      detect an unauthorized activity associated with a honeypot file or honeypot folder, wherein the honeypot file is a virtual file generated as a spoofed file system response using a filter driver or the honeypot folder is a virtual folder generated as the spoofed file system response using the filter driver, wherein the virtual file is dynamically generated using the filter driver with at least one of the following: a spoofed header, a spoofed time stamp, and a spoofed file size; and
      perform an action based on a policy in response to the unauthorized activity associated with the honeypot file or honeypot folder; and
   a memory coupled to the processor and configured to provide the processor with instructions.

2. The system of claim 1, wherein the processor is further configured to monitor file system activities on a computing device for one or more of the following: detecting a file open event associated with the honeypot file, detecting a setting file information event associated with the honeypot file, detecting a writing into a file event associated with the honeypot file, and detecting an enumerating a directory event associated with the honeypot folder.

3. The system of claim 1, wherein the processor is further configured to generate a plurality of honeypot files and/or a plurality of honeypot folders.

4. The system of claim 1, wherein the processor is further configured to generate a plurality of honeypot files and/or a plurality of honeypot folders in a protected directory.

5. The system of claim 1, wherein detect the unauthorized activity associated with the honeypot file or the honeypot folder further comprises:
   detect an enumerating directory event on a computing device;
   allow a default system behavior if the enumerating directory event is associated with a non-protected directory; and
   inject fake start entries if the enumerating directory event is associated with an enumeration at a beginning of a protected directory or inject fake end entries if the enumerating directory event is associated with an enumeration at an end of the protected directory.

6. The system of claim 1, wherein the processor is further configured to kill a process based on the policy in response to the unauthorized activity associated with the honeypot file or the honeypot folder associated with the process.

7. The system of claim 1, wherein the processor is further configured to generate an alert based on the policy in response to the unauthorized activity associated with the honeypot file or honeypot folder.

8. A method, comprising:
   detecting an unauthorized activity associated with a honeypot file or honeypot folder, wherein the honeypot file is a virtual file generated as a spoofed file system response using a filter driver or the honeypot folder is a virtual folder generated as the spoofed file system response using the filter driver, wherein the virtual file is dynamically generated using the filter driver with at least one of the following: a spoofed header, a spoofed time stamp, and a spoofed file size; and performing an action based on a policy in response to the unauthorized activity associated with the honeypot file or honeypot folder.

9. The method of claim 8, further comprising monitoring file system activities on a computing device for one or more of the following: detecting a file open event associated with the honeypot file, detecting a setting file information event associated with the honeypot file, detecting a writing into a file event associated with the honeypot file, and detecting an enumerating a directory event associated with the honeypot folder.

10. The method of claim 8, further comprising generating a plurality of honeypot files and/or a plurality of honeypot folders.

11. The method of claim 8, further comprising generating a plurality of honeypot files and/or a plurality of honeypot folders in a protected directory.

12. The method of claim 8, further comprising killing a process based on the policy in response to the unauthorized activity associated with the honeypot file or the honeypot folder associated with the process.

13. The method of claim 8, further comprising generating an alert based on the policy in response to the unauthorized activity associated with the honeypot file or honeypot folder.

14. The method of claim 8, further comprising:
   detecting an enumerating directory event on a computing device;
   allowing a default system behavior if the enumerating directory event is associated with a non-protected directory; and
   injecting fake start entries if the enumerating directory event is associated with an enumeration at a beginning of a protected directory or inject fake end entries if the enumerating directory event is associated with an enumeration at an end of the protected directory.

15. A computer program product, the computer program product being embodied in a tangible non-transitory computer readable storage medium and comprising computer instructions for:
   detecting an unauthorized activity associated with a honeypot file or honeypot folder, wherein the honeypot file is a virtual file generated as a spoofed file system response using a filter driver or the honeypot folder is a virtual folder generated as the spoofed file system response using the filter driver, wherein the virtual file is dynamically generated using the filter driver with at least one of the following: a spoofed header, a spoofed time stamp, and a spoofed file size; and
   performing an action based on a policy in response to the unauthorized activity associated with the honeypot file or honeypot folder.

16. The computer program product recited in claim 15, further comprising computer instructions for monitoring file system activities on a computing device for one or more of the following: detecting a file open event associated with the honeypot file, detecting a setting file information event associated with the honeypot file, detecting a writing into a file event associated with the honeypot file, and detecting an enumerating a directory event associated with the honeypot folder.

17. The computer program product recited in claim 15, further comprising computer instructions for generating a plurality of honeypot files and/or a plurality of honeypot folders.

18. The computer program product recited in claim 15, further comprising computer instructions for generating a plurality of honeypot files and/or a plurality of honeypot folders in a protected directory.

19. The computer program product of claim 15, further comprising computer instructions for killing a process based on the policy in response to the unauthorized activity associated with the honeypot file or the honeypot folder associated with the process.

20. The computer program product of claim 15, further comprising computer instructions for generating an alert based on the policy in response to the unauthorized activity associated with the honeypot file or honeypot folder.

21. The computer program product of claim 15, further comprising computer instructions for:
   detecting an enumerating directory event on a computing device;
   allowing a default system behavior if the enumerating directory event is associated with a non-protected directory; and
   injecting fake start entries if the enumerating directory event is associated with an enumeration at a beginning of a protected directory or inject fake end entries if the enumerating directory event is associated with an enumeration at an end of the protected directory.

* * * * *

UNITED STATES PATENT AND TRADEMARK OFFICE
CERTIFICATE OF CORRECTION

| | |
|---|---|
| PATENT NO. | : 11,531,753 B2 |
| APPLICATION NO. | : 17/228554 |
| DATED | : December 20, 2022 |
| INVENTOR(S) | : Eldar Aharoni et al. |

It is certified that error appears in the above-identified patent and that said Letters Patent is hereby corrected as shown below:

In the Specification

In Column 4, Line 32, delete "Traps'" and insert --Traps™--, therefor.

In Column 7, Line 6, delete "Traps'" and insert --Traps™--, therefor.

In Column 11, Line 14, delete "Traps'" and insert --Traps™--, therefor.

In Column 11, Line 58, delete "Traps'" and insert --Traps™--, therefor.

In Column 12, Line 26, delete "Traps'" and insert --Traps™--, therefor.

In Column 13, Line 37, delete "Traps'" and insert --Traps™--, therefor.

In Column 16, Line 3, delete "Traps'" and insert --Traps™--, therefor.

Signed and Sealed this
Twenty-first Day of November, 2023

*Katherine Kelly Vidal*

Katherine Kelly Vidal
*Director of the United States Patent and Trademark Office*